United States Patent
Abdel Shahid et al.

(10) Patent No.: US 11,503,488 B2
(45) Date of Patent: Nov. 15, 2022

(54) NON-STANDALONE ARCHITECTURE FRAME ALIGNMENT

(71) Applicant: T-Mobile USA, Inc., Bellevue, WA (US)

(72) Inventors: Wafik Abdel Shahid, Kenmore, WA (US); Ming Shan Kwok, Seattle, WA (US); Neng-Tsann Ueng, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 135 days.

(21) Appl. No.: 16/997,733

(22) Filed: Aug. 19, 2020

(65) Prior Publication Data

US 2022/0061001 A1 Feb. 24, 2022

(51) Int. Cl.
*H04B 17/21* (2015.01)
*H04B 17/24* (2015.01)
(Continued)

(52) U.S. Cl.
CPC ............ *H04W 24/10* (2013.01); *H04B 17/21* (2015.01); *H04B 17/24* (2015.01); *H04B 17/318* (2015.01);
(Continued)

(58) Field of Classification Search
CPC ... H04B 7/02–12; H04B 17/0082–3913; H04J 11/0023–0093;
(Continued)

(56) References Cited

U.S. PATENT DOCUMENTS 10,542,539 B2   1/2020 Huang et al.
2015/0327249 A1*  11/2015 Kitazoe ............ H04W 56/0015
(Continued)

FOREIGN PATENT DOCUMENTS

WO    WO2019137413 A1    7/2019
WO    WO-2021036569 A1 *  3/2021 ............ H04W 24/08

OTHER PUBLICATIONS

Bansai, Suresh Kumar; "LTE-A Timing Advance," LTE for Geeks, downloaded at: https://lteforgeeks.blogspot.com/2015/07/timing-advance-for-lte-a.html, 5 pages.

*Primary Examiner* — Timothy J Weidner
(74) *Attorney, Agent, or Firm* — Lee & Hayes, P.C.

(57) ABSTRACT

Techniques for measuring and reducing signal misalignment in a dual connectivity environment are discussed herein. When using Non-Standalone Architecture (NSA), a device initially communicates with a network using a Long-Term Evolution (LTE) connection. After the LTE connection is established, an LTE base station may instruct the device to measure signal strength of a neighboring New Radio (NR) cell during a specified LTE measurement gap. When the NR cell is implemented by an indoor NR base station, the NR signal may not be sufficiently synchronized with the LTE signal and the device may be unable to measure the NR signal during the measurement gap. In these cases, the device can determine the frame timing difference between the LTE and NR signals, obtain an adjusted measurement gap that reduces any measurement gap misalignment, and attempt to measure the signal strength of the NR cell using the adjusted measurement gap.

17 Claims, 5 Drawing Sheets

(51) Int. Cl.
| | |
|---|---|
| H04B 17/318 | (2015.01) |
| H04L 5/00 | (2006.01) |
| H04W 24/02 | (2009.01) |
| H04W 24/08 | (2009.01) |
| H04W 24/10 | (2009.01) |
| H04W 28/02 | (2009.01) |
| H04W 28/08 | (2009.01) |
| H04W 56/00 | (2009.01) |
| H04W 72/04 | (2009.01) |
| H04W 76/15 | (2018.01) |
| H04W 76/18 | (2018.01) |
| H04W 76/19 | (2018.01) |
| H04W 84/02 | (2009.01) |
| H04W 88/06 | (2009.01) |
| H04W 88/08 | (2009.01) |
| H04W 92/02 | (2009.01) |
| H04W 92/10 | (2009.01) |

(52) U.S. Cl.
CPC .......... *H04L 5/0032* (2013.01); *H04L 5/0076* (2013.01); *H04L 5/0092* (2013.01); *H04W 24/02* (2013.01); *H04W 24/08* (2013.01); *H04W 28/0247* (2013.01); *H04W 28/0815* (2020.05); *H04W 28/0819* (2020.05); *H04W 56/001* (2013.01); *H04W 56/003* (2013.01); *H04W 56/0015* (2013.01); *H04W 72/042* (2013.01); *H04W 72/044* (2013.01); *H04W 72/0446* (2013.01); *H04W 76/15* (2018.02); *H04W 76/18* (2018.02); *H04W 76/19* (2018.02); *H04W 84/02* (2013.01); *H04W 88/06* (2013.01); *H04W 88/08* (2013.01); *H04W 92/02* (2013.01); *H04W 92/10* (2013.01)

(58) Field of Classification Search
CPC .. H04J 2011/0003–0096; H04L 5/0001–0098; H04W 8/22–245; H04W 24/02–10; H04W 28/02–26; H04W 36/0005–385; H04W 48/02–20; H04W 56/0005–0095; H04W 72/005–14; H04W 74/002–0891; H04W 76/10–50; H04W 84/02–16; H04W 88/02–12; H04W 92/02; H04W 92/04; H04W 92/10
See application file for complete search history.

(56) References Cited

U.S. PATENT DOCUMENTS

| | | |
|---|---|---|
| 2017/0201987 A1 | 7/2017 | Huang et al. |
| 2018/0077596 A1 | 3/2018 | Huang et al. |
| 2019/0215711 A1 | 7/2019 | Tsai et al. |
| 2019/0274146 A1 | 9/2019 | Tang et al. |

* cited by examiner

NON-STANDALONE ARCHITECTURE FRAME ALIGNMENT

BACKGROUND

Cellular communication devices use various network radio access technologies to communicate wirelessly with geographically distributed base stations. Long-Term Evolution (LTE) is an example of a widely implemented radio access technology, which is used within $4^{th}$-Generation (4G) communication systems. New Radio (NR) is a newer radio access technology that is used in $5^{th}$-Generation (5G) communication systems. Standards for LTE and NR radio access technologies have been developed by the $3^{rd}$-Generation Partnership Project (3GPP) for use within cellular communication networks by wireless communication carriers. Note that the terms 4G and LTE are often used interchangeably when referencing certain 4G systems and components. Also, NR radio access technology may at times be referred to as 5G radio access technology.

A configuration defined by the 3GPP in the 5G NR specification, referred to as Non-Standalone Architecture (NSA), allows the simultaneous use of 4G and 5G systems for cellular communications. Specifically, NSA uses dual connectivity (DC), in which a communication device uses both LTE and NR radio access technologies for communicating with respective LTE and NR base stations.

Existing 4G networks use relatively low radio frequencies, such as frequencies in bands below 6 GHz. 5G networks are able to use an extended range of frequency bands compared to 4G networks, such as higher frequency bands in in the range of 6-100 GHz. Radio communications using the higher frequency 5G bands can support higher data speeds, but also have disadvantages compared to the lower frequency bands. Specifically, radio signals in the higher frequencies have shorter range and are more easily blocked by physical objects. Accordingly, some cellular network designs include the use of what are referred to as small cells, in which 5G base stations are installed at a higher geographic density than would otherwise be the case. For example, 5G base stations, also referred to as gNodeB's (gNB's), may be placed at multiple locations within a building and used in conjunction with a nearby eNodeB (eNB) for NSA dual connectivity.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
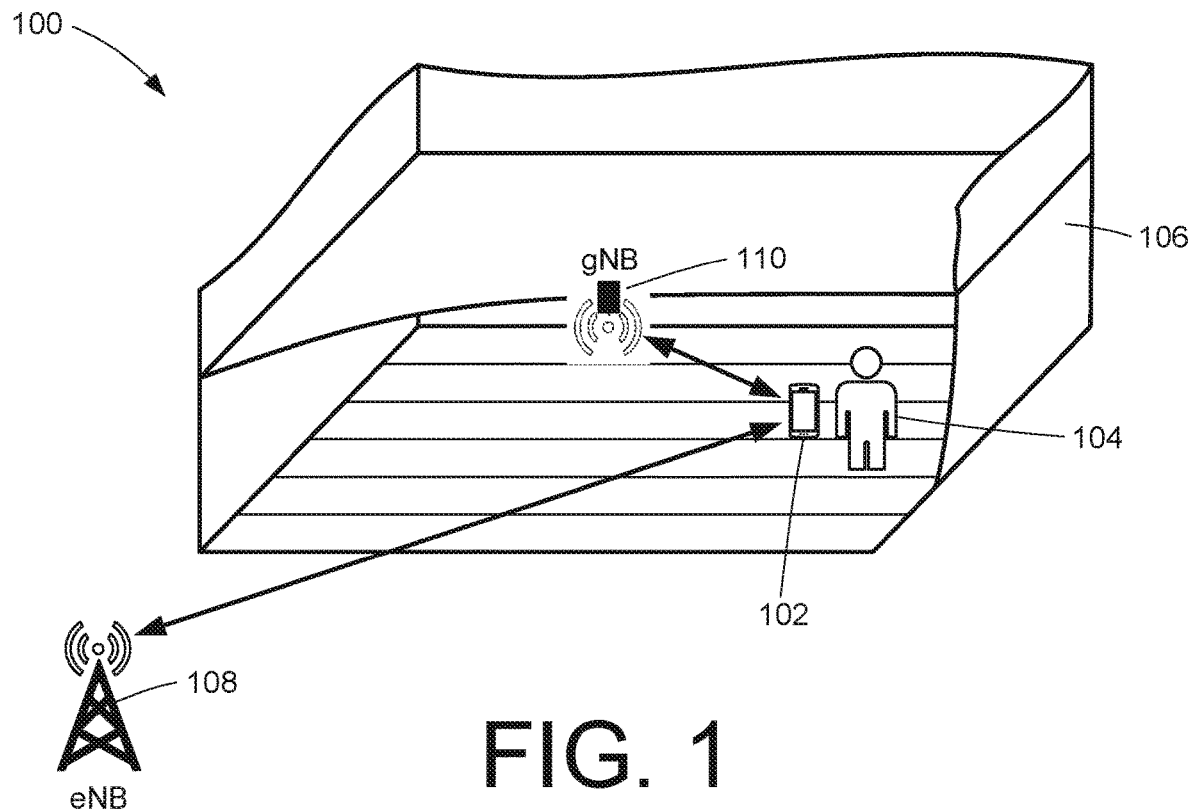
FIG. 1 is a diagram illustrating an example of an indoor New Radio (NR) base station being used to implement Non-Standalone Architecture (NSA) in conjunction with a Long-Term Evolution (LTE) base station.

Described herein are techniques for supporting Non-Standalone Architecture (NSA) and other forms of dual connectivity. The described techniques are particularly useful in systems in which NSA is implemented using a $4^{th}$-Generation (4G) Long-Term Evolution (LTE) base station in conjunction with $5^{th}$-Generation (5G) New Radio (NR) small cell base stations.

NR small cell base stations may often be indoors. Because of this, they may have difficultly receiving time broadcasts that would otherwise be used for signal synchronization with 4G base stations. In outdoor installations, for example, 5G base stations may use time broadcasts of the Global Positioning Satellite (GPS) system for signal synchronization. An indoor 5G base station, however, may be unable to receive a GPS signal.

In both 4G and 5G communications, data is carried in a sequence of frames and subframes. For NSA communications, a device receives a sequence of frames from a 4G base station and another sequence of frames from a 5G base station. The frame sequences are intended to be closely aligned in time, although a degree of misalignment is allowed. For synchronous communications, for example, a cellular device can tolerate up to 33 microseconds of misalignment. Some devices may allow asynchronous frame timing, in which a frame misalignment of up to 500 microseconds is tolerated.

When using NSA, a 4G Long-Term Evolution (LTE) communication channel anchors a communication session and a 5G New Radio (NR) communication channel is added when possible. After a cellular device initially establishes the LTE channel, the 4G base station sends a Radio Resource Control (RRC) reconfiguration message to the device, instructing the device to measure one or more 5G New Radio (NR) signals whose radio frequencies have previously been specified. The device performs an NR signal measurement by configuring its radio to one of the specified frequencies and attempting to acquire primary and secondary NR synchronization signals on that frequency. The synchronization signals, referred to collectively as a Synchronization Signal Block (SSB), occur at known temporal positions within the NR frame sequence.

To allow NR SSB detection and measurement using a single radio of a communication device, the 4G base station specifies a recurring period of time within the LTE frame sequence during which 5G signal measurement is to take place. This time period is referred to as a measurement gap. The ability to detect the SSB during the 4G measurement gap relies on adequate alignment of the LTE and NR frame sequences, so that the temporal position of the NR SSB is known relative to the LTE frame sequence and so that the 4G measurement gap encompasses the time during which the NR SSB occurs.

In indoor installations in which a 5G base station may not have an accurate time reference, frame timing differences between LTE and NR signals may be significant and aligning the LTE measurement gap with the NR frame sequence may be problematic. To address this issue, a cellular communication device may be configured to measure and report the amount of misalignment in situations in which the LTE and NR signals are not sufficiently aligned for detection of the NR synchronization signals during the LTE measurement gap.

More particularly, in cases where the communication device is unable to acquire NR synchronization signals due to misalignment of the LTE and NR frame sequences, the communication device may in some cases determine the amount of misalignment between the LTE and NR frame sequences. In some implementations, for example, the communication device may be configured to compare frame numbers and/or subframe numbers of currently received LTE and NR frame sequences and to determine the number of frames and/or subframes by which the signals are out of alignment. In other cases, the communication device may be configured to determine a time measurement corresponding to the amount of time by which the LTE and NR signals are misaligned.

The determined amount of misalignment, which may also be referred to as a frame timing difference, may be used to determine the timing of an adjusted measurement gap that reduces measurement gap misalignment. The communication device may then use the adjusted measurement gap when making a second attempt to acquire the NR SSB.

In some cases, the communication device itself may determine the timing of the adjusted measurement gap and initiate a second measurement attempt. In other cases, the LTE base station may be configured to respond to a reported misalignment by adjusting the timing of the measurement gap, sending the adjusted measurement gap to the communication device, and instructing the communication device to make a second attempt to acquire the NR synchronization signals using the adjusted measurement gap.

The described techniques improve the experiences of users by ensuring that cellular devices can utilize 5G small cell signals as part of NSA communications, despite misalignment of the small cell signals. This can in some cases allow significantly higher data rates, as well as other communication advantages provided by 5G signals.

FIG. 1 illustrates an example cellular communication system 100 in which the described techniques may be implemented. The system includes a mobile cellular communication device 102 that is associated with and used by a user 104. In this example, the user 104 and the communication device 102 are within a multi-story building 106. The communication device 102 communicates wirelessly with a Long-Term Evolution (LTE) base station 108, also referred to as an eNodeB or eNB 108. The eNB 108 supports $5^{th}$-Generation (5G) Non-Standalone Architecture (NSA) in conjunction with various 5G base stations such as the illustrated gNodeB or gNB 110, which is positioned in a ceiling of the building 106, in this case near the user 104.

The communication device 102 in this example may comprise a wireless, mobile device that has both 4G and 5G cellular capabilities. The device 102 is also configured to support NSA in conjunction with the eNB 108 and the gNB 110. The communication device 102 may comprise any of various types of communication devices that are capable of wireless data and/or voice communications, including smartphones and other mobile devices, "Internet-of-Things" (IoT) devices, smarthome devices, computers, wearable devices, entertainment devices, industrial control equipment, etc. In some environments, the wireless communication device 102 may be referred to as a User Equipment (UE) or Mobile Station (MS). The communication device 102 may in some cases be handheld and/or mobile, although in other cases the device 102 may be relatively stationary.

The eNB 108 may be one of multiple 4G base stations such are geographically distributed to serve relatively large geographic areas. More specifically, the eNB 108 may be any of multiple 4G base stations that are part of a 4G cellular infrastructure and that are configured to support NSA. 4G base stations such as this may be positioned on dedicated towers or other structures, which are typically outdoors.

The gNB 110 may be one of multiple 5G small cell base stations, also known as macro cell base stations, that are positioned at a relatively high density to be used in conjunction with the eNB 108 for NSA communications. In this case, the gNB 110 is indoors. Because of this, it may be unable to receive Global Positioning System (GPS) signals, which would otherwise be used to obtain an accurate time reference. Without an accurate time reference, the gNB 110 may not be able to synchronize its transmitted frame sequence with 4G LTE signals such as those generated by the eNB 108. The techniques described herein may be used to align an LTE measurement gap with an NR frame sequence despite this lack of synchronization, thereby allowing NSA communications.

Figure 2:
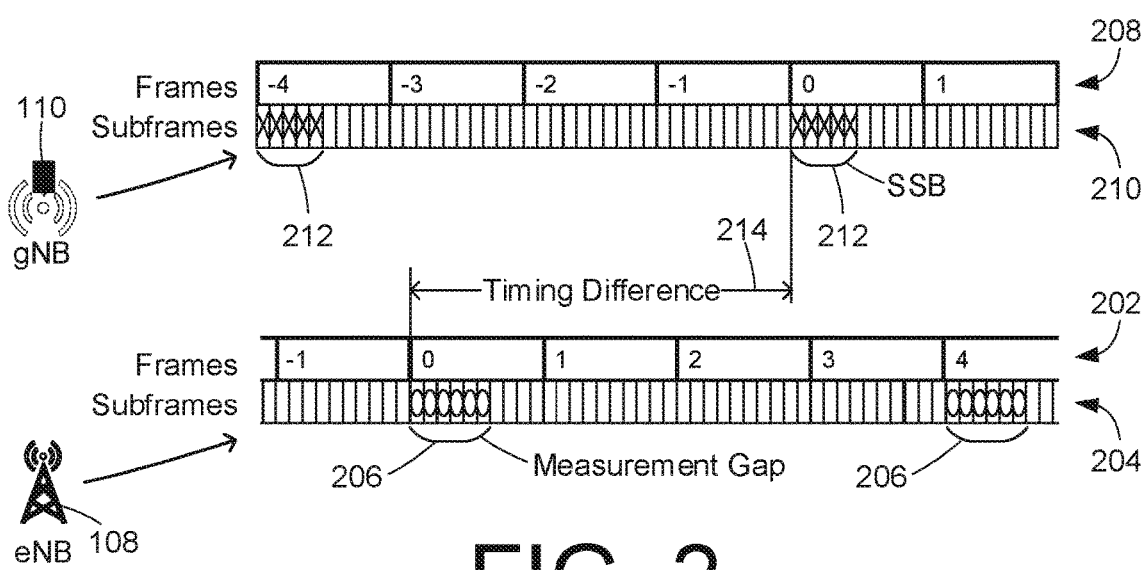
FIG. 2 is a timing diagram illustrating frame sequences transmitted respectively by LTE and NR base stations.

FIG. 2 illustrates an example of wireless transmissions by the eNB 108 and the gNB 110. The eNB 108 transmits a sequence of frames 202, each of which comprises a number of subframes 204. In this example, a measurement gap 206 has been specified as a time period that occurs at the beginning of every $4^{th}$ frame.

The gNB 110 similarly transmits a sequence of frames 208, each of which comprises a number of subframes 210. In this example, a Synchronization Signal Block (SSB) 212 is transmitted by the gNB 110 at the beginning of every $4^{th}$ frame.

It is intended that the frame sequences 202 and 208 be synchronized when received by the device 102. That is, the eNB frame 0 should be received at approximately the same time as the gNB frame 0. More specifically, the alignment should be within 30 microseconds for synchronous communications and 500 microseconds for asynchronous communications. If the frame sequences 202 and 208 are sufficiently aligned, the SSB 212 will be aligned with the measurement gap 206 and the device 102 will be able to acquire and measure the SSB 212. If the frame sequences 202 and 208 are not aligned, the device may not be able to acquire and measure the SSB 212.

In FIG. 2, the frames are not synchronized or aligned. More specifically, there is a frame timing difference 214 of three frames between the LTE frame sequence 202 and the NR frame sequence 208. As a result, the communication device 102 will not be successful when it attempts to acquire the NR SSB 212 and to measure the NR communication channel. However, in embodiments described herein the communication device 102 is configured to determine the frame timing difference 214 between the LTE and NR frame sequences and to obtain an adjusted measurement gap that accounts for the frame timing difference 214, so that a subsequent attempt to measure the NR communication channel is more likely to be successful.

Figure 3:
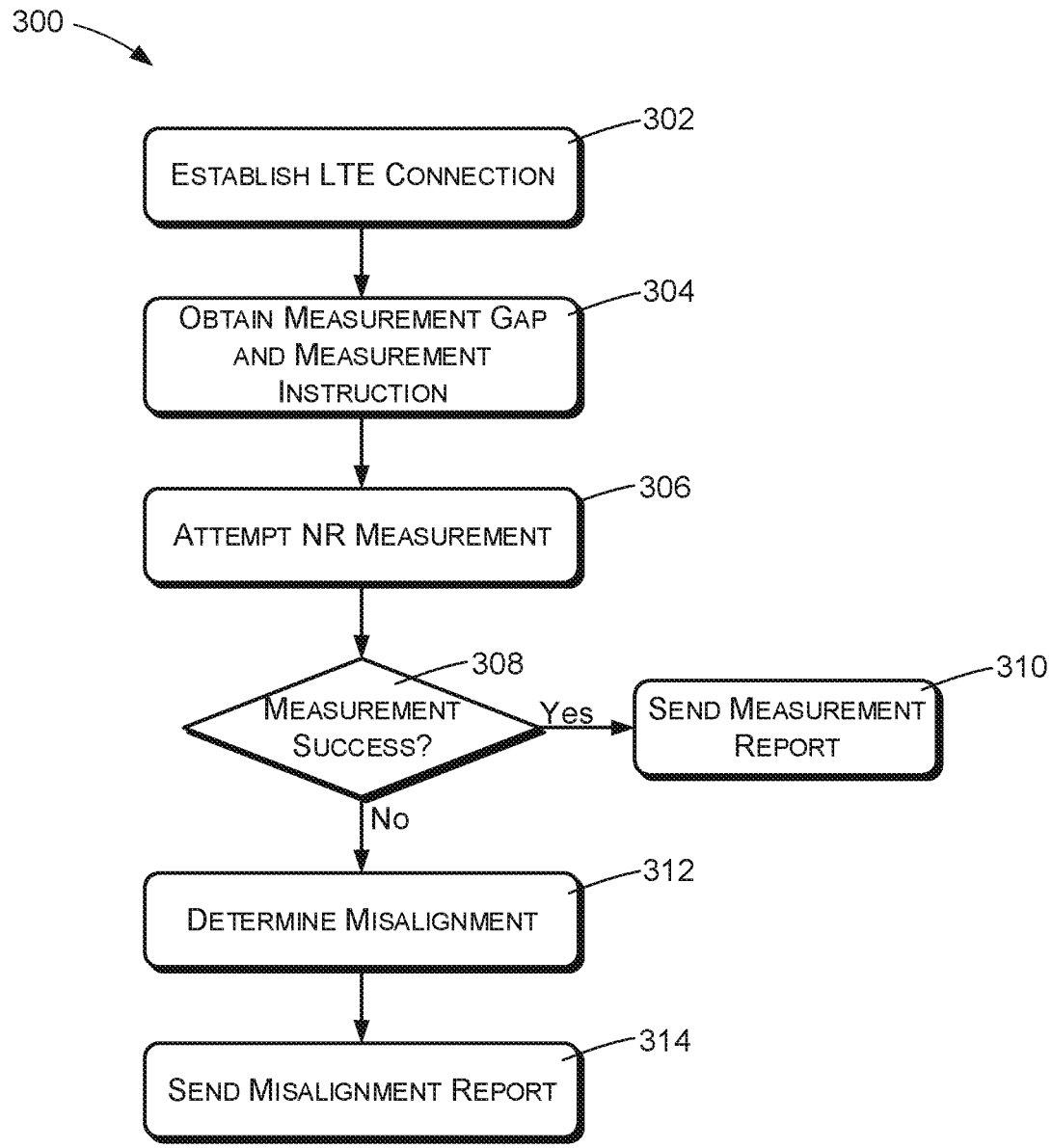
FIG. 3 is a flow diagram illustrating an example method that may be performed by a wireless communication device in accordance with techniques described herein.

FIG. 3 illustrates an example method 300 that may be performed by a cellular communication device, such as the device 102 of FIG. 1, within a cellular communication system that supports NSA or other forms of dual connectivity, such as the system 100 illustrated by FIG. 1.

An action 302 comprises establishing a connection with a 4G base station of an LTE radio access network and communicating with the LTE base station and LTE radio access network through an LTE communication channel. The LTE base station may be configured to support NSA in conjunction with one or more 5G NR base stations. Note that although certain embodiments are described herein as being used with LTE and NR radio access technologies, the same or similar techniques may be used in conjunction with various radio access technologies, not limited to LTE and NR.

An action 304 comprises obtaining a measurement gap and receiving a measurement instruction from the LTE base station over the LTE communication channel. In this example, obtaining the measurement gap may comprise receiving the measurement gap from the LTE base station prior to receiving the measurement instruction. The measurement instruction directs the communication device to measure an NR communication channel that will be used in combination with the LTE communication channel for NSA dual connectivity. For example, the instruction may comprise a Radio Resource Control (RRC) reconfiguration message. The instruction specifies that the measurement is to be performed during an LTE measurement gap, which in some cases is specified in a measurement object provided to the communication device prior to receiving the measurement instruction. For example, the measurement object may specify the channel, frequency band, and/or specific frequency to be measured.

In the described environment, the requested measurement is an inter-frequency measurement, in that the LTE communication channel and the NR communication channel are at different frequencies and/or in different frequency bands. More specifically, the LTE communication channel is implemented by a signal having a first radio frequency that is within a first radio frequency band and the NR communication channel is implemented by a signal having a second radio frequency that is within a second radio frequency band, wherein the first radio frequency is different than the second radio frequency and/or the first frequency band is different than the second frequency band.

An action 306 comprises attempting to measure the NR communication channel during the previously specified measurement gap. Measuring such as this comprises tuning to a specified channel and frequency, acquiring primary and secondary synchronization signals of the NR communication channel, and measuring the signal strength of any acquired synchronization signals.

An action 308 comprises a determination regarding whether the measurement of action 306 was successful. If the measurement was successful and an NR signal strength was measured, an action 310 is performed of sending a measurement report to the LTE base station. The measurement report specifies the signal strength of the measured NR radio signal.

In some cases, the attempt to measure the NR communication channel may fail due to misalignment between the frame sequences of the LTE and NR communication channels. More specifically, because of the misalignment the communication device may be unable to acquire the NR synchronization signals during the specified measurement gap. In this case, an action 312 is performed of determining the amount of misalignment between the frame sequence of the LTE communication signal and the frame sequence of the NR communication signal. In some embodiments, the amount of misalignment may be specified as a frame timing difference, and the frame timing difference may be specified as a length of time by which the two communication channels are out of alignment. In other embodiments, the frame timing difference may be specified as a number of frames and/or subframes by which the two communication channels are out of alignment.

An action 314 comprises reporting or otherwise sending a misalignment report to the LTE base station, specifying a measurement or metric representing the amount of frame misalignment between the LTE communication channel and the NR communication channel. For example, the frame timing difference mentioned above may be sent to the LTE base station.

In response to receiving the frame timing difference, the LTE base station may adjust the LTE measurement gap by determining a new timing of the LTE measurement gap that reduces the amount of measurement gap misalignment. The LTE base station may then send the adjusted LTE measurement gap to the communication device. The communication device then repeats the actions of FIG. 3 with the adjusted LTE measurement gap, beginning at the action 304. For example, the action 304 may in this case comprise obtaining the adjusted LTE measurement gap from the LTE base station, wherein the timing of the adjusted LTE measurement gap has been determined by the LTE base station based at least in part on the previously reported amount of misalignment. The action 306 in this example comprises again attempting to measure the NR communication channel, in this case with the adjusted LTE measurement gap. Assuming that the adjusted LTE measurement gap now aligns with the NR synchronization signals, the action 306 of attempting to measure the NR signal will now be successful and the measurement report will be sent in the action 310.

Figure 4:
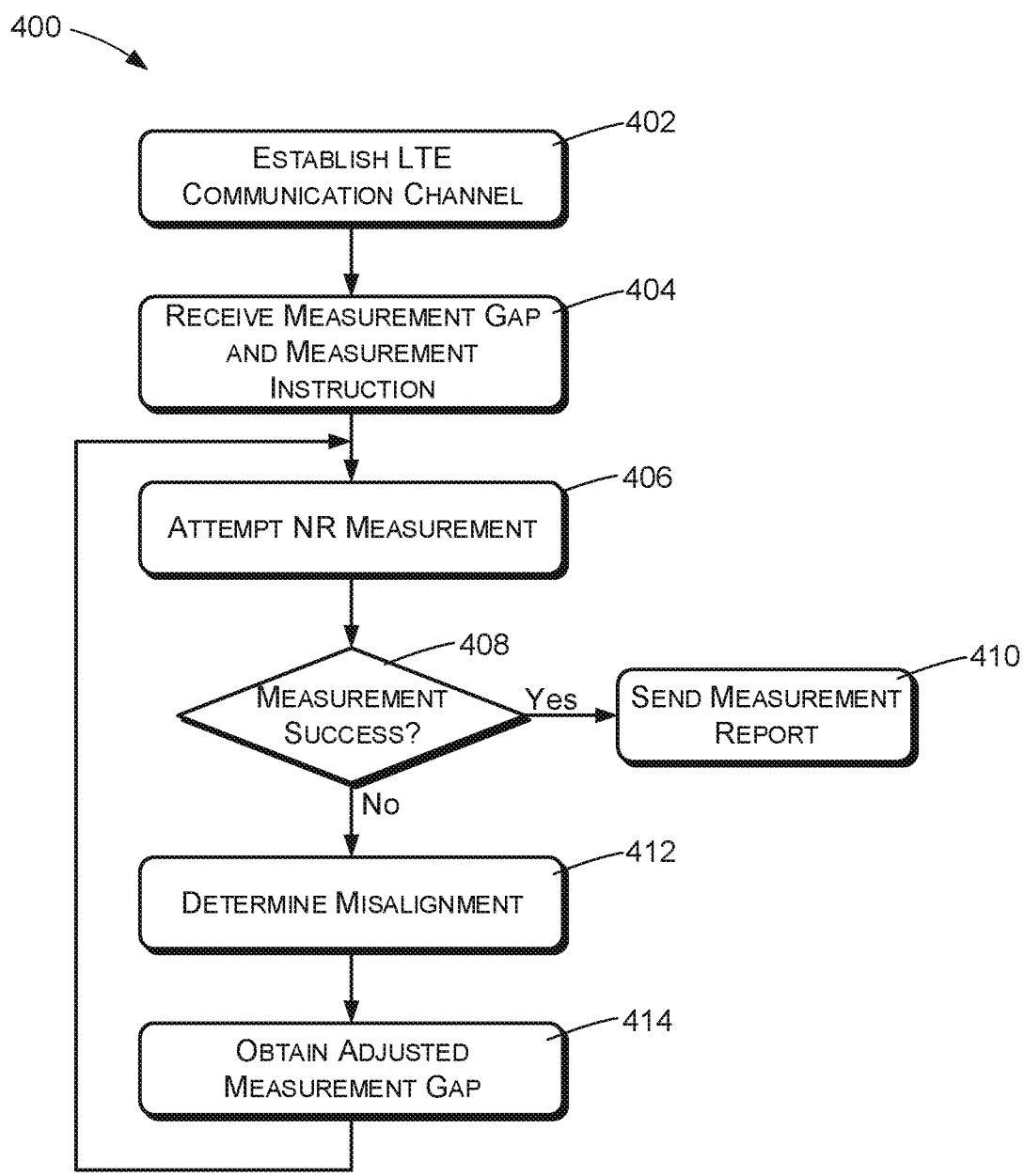
FIG. 4 is a flow diagram illustrating another example method that may be performed by a wireless communication device in accordance with techniques described herein.

FIG. 4 illustrates another example method 400 that may be performed by a cellular communication device, such as the device 102 of FIG. 1, within a cellular communication system that supports NSA or other forms of dual connectivity. The method 400 is similar to the method 300 of FIG. 3 except for the manner of obtaining the adjusted measurement gap and of initiating the second attempt to measure the NR communication channel.

An action 402 comprises establishing a connection with a 4G LTE base station of an LTE radio access network and communicating with the LTE base station and LTE radio access network through an LTE communication channel. The LTE base station may be configured to support NSA in conjunction with one or more 5G NR base stations.

An action 404 comprises obtaining a measurement gap and receiving a measurement instruction from the LTE base station over the LTE communication channel. The measurement instruction directs the communication device to measure an NR communication channel that will be used in combination with the LTE communication channel for NSA dual connectivity. For example, the measurement instruction may comprise an RRC reconfiguration message. The measurement instruction specifies that the measurement is to be performed during an LTE measurement gap, which in some cases is specified in a measurement object provided to the communication device prior to receiving the measurement instruction. For example, the measurement object may specify the channel, frequency band, and/or specific frequency to be measured.

In the described environment, the measurement requested by the LTE base station is an inter-frequency measurement, in that the LTE communication channel and the NR communication channel are at different frequencies and/or in different frequency bands. More specifically, the LTE communication channel is implemented by a signal having a first radio frequency that is within a first radio frequency band and the NR communication channel is implemented by a signal having a second radio frequency that is within a second radio frequency band, wherein the first radio frequency is different than the second radio frequency and/or the first frequency band is different than the second frequency band.

An action 406 comprises attempting to measure the NR communication channel during the previously specified measurement gap. Measuring such as this comprises tuning to the specified channel and frequency, acquiring primary and secondary synchronization signals of the NR communication channel, and measuring the signal strength of any acquired synchronization signals.

An action 408 comprises a determination regarding whether the measurement of action 406 was successful. If the measurement was successful and an NR signal strength was measured, an action 410 is performed of sending a measurement report to the LTE base station. The measurement report specifies the signal strength of the measured NR radio signal.

In some cases, the attempt to measure the NR communication channel may fail due to a measurement gap misalignment. In this case, an action 412 is performed of determining an amount of misalignment between the frame sequence of the LTE communication signal and the frame sequence of the NR communication signal. In some embodiments, the amount of misalignment may be specified as a frame timing difference, and the frame timing difference may be specified as a length of time. In other embodiments, the frame timing difference may be specified as a number of frames and/or subframes by which the two signals are out of alignment.

After determining the amount of misalignment, an action 414 may be performed of obtaining an adjusted measurement gap, wherein the adjusted measurement gap has a timing that reduces the measurement gap misalignment. In this example, the communication device itself may determine the timing of the adjusted measurement gap, based on the determined misalignment, without reporting the amount of the misalignment to the LTE base station.

After having obtained the adjusted LTE measurement gap, the communication device repeats the actions of FIG. 4 of again attempting to measure the NR communication channel, in this case with the adjusted LTE measurement gap, beginning at the action 406. Assuming that the adjusted LTE measurement gap now aligns with the NR synchronization signals, the action 406 of attempting to measure the NR signal will now be successful and the measurement report will be sent to the LTE base station in the action 410.

Figure 5:
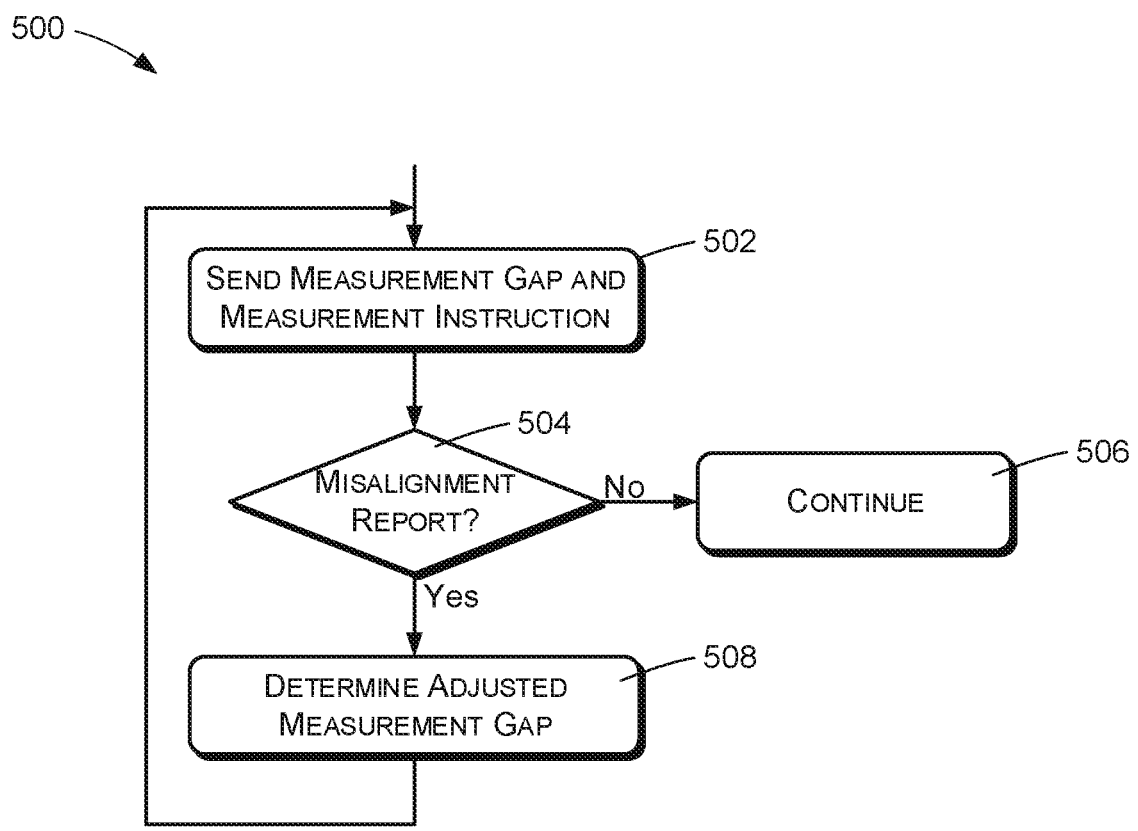
FIG. 5 is a flow diagram illustrating an example method that may be performed by a cellular base station or other component of a cellular communication system in accordance with techniques described herein.

FIG. 5 illustrates an example method 500 that may be performed by a base station, such as an LTE base station, in accordance with the techniques described herein. The LTE base station may be configured to support NSA in conjunction with co-located or neighboring NR base stations, for example. The method 500 may be performed in conjunction with the method 300 of FIG. 3.

An action 502 comprises sending a measurement gap and a measurement instruction to the communication device. For example, the action 502 may comprise sending a measurement object to the communication device to specify a measurement gap and an NR channel and/or frequency to be measured. The LTE base station may then send a measurement instruction, such as an RRC reconfiguration message, instructing the communication device to measure the specified NR communication channel using the specified measurement gap.

Depending on the result of the measurement instructed in the action 502, the LTE base station may receive a misalignment report from the communication device, indicating an amount of misalignment between the currently active LTE communication channel and an NR communication channel that the device had been instructed to measure. The amount of misalignment may be specified as a frame timing difference, such as a time difference or a frame difference.

The action 504 comprises a determination of whether a misalignment report is received from the communication device. If a misalignment report is not received in response to the measurement instruction, the device continues with normal operations as indicated by the action 506, in accordance with applicable protocols and standards. For example, the device may subsequently receive a measurement report and in response may continue with further actions to add a measured NR channel for NSA communications.

If a misalignment report is received in response to the measurement instruction, however, an action 508 is performed of determining an adjusted LTE measurement gap, based at least in part on the reported amount of misalignment, to reduce the measurement gap misalignment that prevented the communication device from successfully measuring the NR communication channel.

The method 500 is then repeated, where the action 502 comprises specifying the adjusted LTE measurement gap to the mobile communication device. Assuming the LTE measurement gap has been correctly adjusted, a measurement report may be received from the communication device rather than the misalignment report and the action 506 operations will continue in the action 506, in accordance with applicable protocols and standards. For example, the LTE base station might take further actions to add the measured NR channel to the existing LTE communication session and to communicate using NSA.

Figure 6:
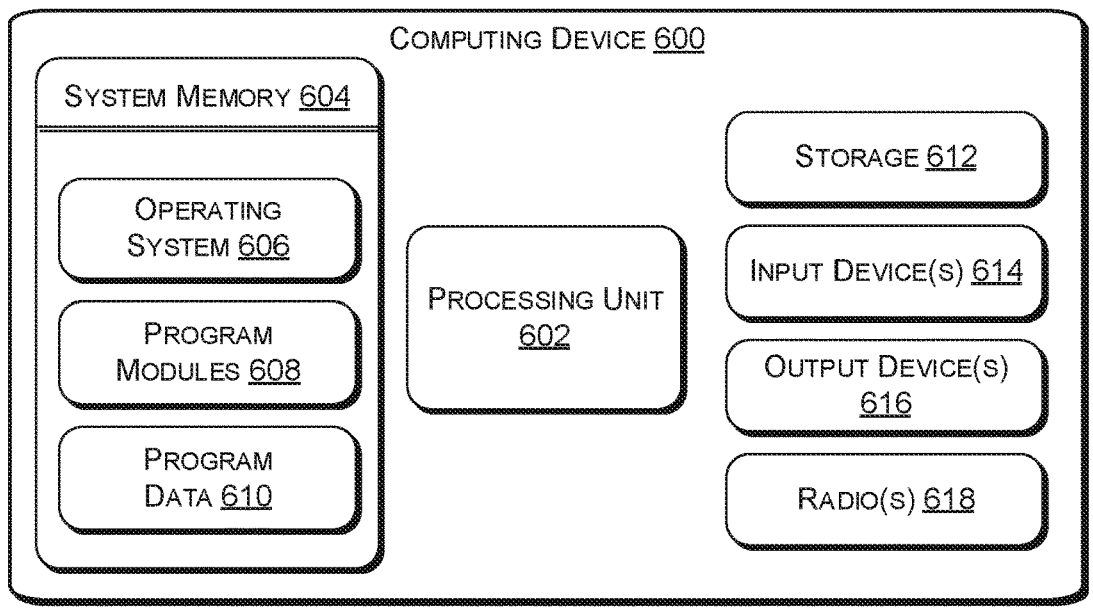
FIG. 6 is a block diagram of an example computing device that may be used to implement various functionality described herein, such as functionality of the referenced base stations.

FIG. 6 is a high-level block diagram of an illustrative computing device 600 such as may be used to implement various components of the wireless communication system 100. In particular, the computing device 600 or a device with similar components may be used to implement base stations within a cellular communication network, such as the eNB 108 and the gNB 110.

In various embodiments, the computing device 600 may include at least one processing unit 602 and system memory 604. Depending on the exact configuration and type of computing device, the system memory 604 may be volatile (such as RAM), non-volatile (such as ROM, flash memory, etc.) or some combination of the two. The system memory 604 may include an operating system 606, one or more program modules 608, and may include program data 610.

The computing device 600 may also include additional data storage devices (removable and/or non-removable) such as, for example, magnetic disks, optical disks, or tape. Such additional storage devices are illustrated in FIG. 6 as storage 612.

Non-transitory computer storage media of the computing device 600 may include volatile and nonvolatile, removable and non-removable media, implemented in any method or technology for storage of information, such as computer readable instructions, data structures, program modules, or other data. The system memory 604 and storage 612 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 600. Any such non-transitory computer-readable storage media may be part of the computing device 600.

In various embodiment, any or all of the system memory 604 and storage 612 may store programming instructions which, when executed, implement some or all of the function functionality described above and attributed to the eNB 108 or gNB 110.

The computing device 600 may also have input device(s) 614 such as a keyboard, a mouse, a touch-sensitive display, voice input device, etc. Output device(s) 616 such as a display, speakers, a printer, etc. may also be included. The computing device 600 may also contain an LTE or NR radio 618 for communicating with cellular devices such as the cellular communication device 102.

Figure 7:
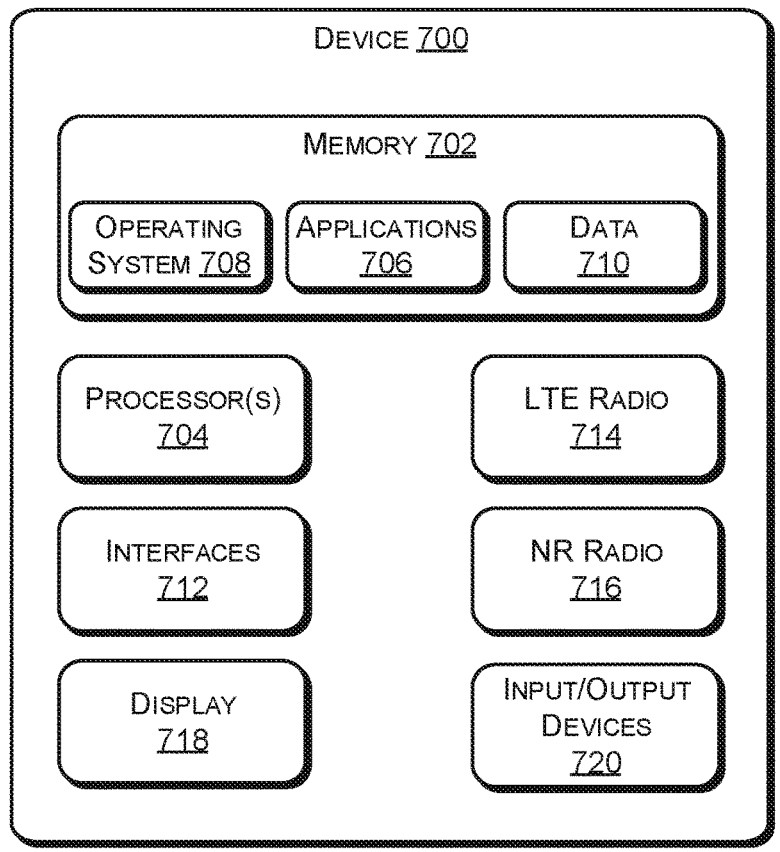
FIG. 7 is a block diagram of an example wireless communication device that may be used in conjunction with the techniques described herein.

FIG. 7 illustrates an example wireless communication device 700 that may be used in conjunction with the techniques described herein. The device 700 is an example of the wireless communication device 102.

The device 700 may include memory 702 and a processor 704. The memory 702 may include both volatile memory and non-volatile memory. The memory 702 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 702 may include a SIM (subscriber identity module), which is a removable smart card used to identify a user of the device 700 to a service provider network.

The memory 702 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information. The memory 702 may in some cases include storage media used to transfer or distribute instructions, applications, and/or data. In some cases, the memory 702 may include data storage that is accessed remotely, such as network-attached storage that the device 700 accesses over some type of data communication network.

The memory 702 stores one or more sets of computer-executable instructions (e.g., software) such as programs that embody operating logic for implementing and/or performing desired functionality of the device 700. The instructions may also reside at least partially within the processor 704 during execution thereof by the device 700. Generally, the instructions stored in the computer-readable storage media may include various applications 706 that are executed by the processor 704, an operating system (OS) 708 that is also executed by the processor 704, and data 710.

In some embodiments, the processor(s) 704 is a central processing unit (CPU), a graphics processing unit (GPU), both CPU and GPU, or other processing unit or component known in the art. Furthermore, the processor(s) 704 may include any number of processors and/or processing cores. The processor(s) 704 is configured to retrieve and execute instructions from the memory 702.

The device 700 may have interfaces 712, which may comprise any sort of interfaces known in the art. The interfaces 712 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 700 may also have an LTE radio 714 and an NR radio 716, which may be used as described above for implementing voice communications using LTE and NR communication networks. The radios 714 and 716 transmit and receive radio frequency communications via an antenna (not shown). In implementation, the device 700 may have a single radio that can be configured and used for both LTE and NR communications.

The device 700 may have a display 718, which may comprise a liquid crystal display (LCD) or any other type of display commonly used in telemobile devices or other portable devices. For example, the display 718 may be a touch-sensitive display screen, which may also act as an input device or keypad, such as for providing a soft-key keyboard, navigation buttons, or the like.

The device 700 may have input and output devices 720. These devices may include any sort of output devices known in the art, such as speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display. A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method performed by one or more components of a cellular communication system, the method comprising:
communicating with a Long-Term Evolution (LTE) radio access network through an LTE communication channel;
receiving a first instruction to measure a New Radio (NR) communication channel during a first LTE measurement gap, wherein the NR communication channel is to be used in combination with the LTE communication channel for dual connectivity;
during the first LTE measurement gap, attempting to measure the NR communication channel, wherein the attempting fails due to a measurement gap misalignment;
in response to failing to measure the NR communication channel, determining a frame timing difference between the LTE communication channel and the NR communication channel, wherein determining the frame timing difference is based on:

comparing frame numbers or subframes numbers of frames or subframes received from the NR communication channel and the LTE communication channel and determining a number of frames or a number of subframes by which signals of the NR communication channel and the LTE communication channel are out of alignment;

reporting the frame timing difference to the LTE radio access network;

receiving a second instruction to measure the NR communication channel during a second LTE measurement gap, wherein the second LTE measurement gap has a timing that reduces the measurement gap misalignment;

during the second LTE measurement gap, measuring the NR communication channel; and sending a measurement report to the LTE radio access network based at least in part on measuring the NR communication channel.

2. The method of claim 1, wherein the second LTE measurement gap is received from a cellular base station.

3. The method of claim 1, wherein:

the LTE communication channel is implemented by a signal having a radio frequency that is within a first radio frequency band; and the NR communication channel is implemented by a signal having a radio frequency that is within a second radio frequency band, wherein the first radio frequency band is different than the second radio frequency band.

4. The method of claim 1, wherein measuring the NR communication channel comprises acquiring primary and secondary synchronization signals of the NR communication channel.

5. A method performed by one or more components of a cellular communication system, the method comprising:

communicating with a cellular base station through a first communication channel;

receiving a first instruction to measure a second communication channel during a first measurement gap, wherein the second communication channel is to be used in combination with the first communication channel for dual connectivity;

during the first measurement gap, attempting to measure the second communication channel to obtain a signal strength, wherein the attempting fails due to a measurement gap misalignment;

in response to failing to measure the second communication channel, determining an amount of misalignment between the first communication channel and the second communication channel, wherein determining the amount of misalignment is based on:

comparing frame numbers or subframes numbers of frames or subframes received from the first communication channel and the second communication channel, and determining a number of frames or a number of subframes by which signals of the first communication channel and the second communication channel are out of alignment;

obtaining a second measurement gap, wherein the second measurement gap has a timing that reduces the measurement gap misalignment; and during the second measurement gap, measuring the second communication channel to obtain the signal strength.

6. The method of claim 5, further comprising reporting the amount of misalignment to the cellular base station, wherein obtaining the second measurement gap comprises receiving the second measurement gap from the cellular base station.

7. The method of claim 5, wherein obtaining the second measurement gap comprises:

by a mobile communication device, determining the timing of the second measurement gap based at least in part on the amount of misalignment.

8. The method of claim 5, wherein:

the first communication channel is implemented by a signal having a radio frequency that is within a first radio frequency band; and the second communication channel is implemented by a signal having a radio frequency that is within a second radio frequency band, wherein the first radio frequency band is different than the second radio frequency band.

9. The method of claim 5, wherein:

the first communication channel uses a first radio access technology; and the second communication channel uses a second radio access technology.

10. The method of claim 5, wherein:

the first communication channel uses a Long-Term Evolution (LTE) radio access technology; and the second communication channel uses a New Radio (NR) radio access technology.

11. The method of claim 5, wherein the second communication channel is a New Radio (NR) communication channel and measuring the second communication channel comprises acquiring one or more synchronization signals of the NR communication channel.

12. The method of claim 5, further comprising reporting the amount of misalignment as the number of frames or the number of subframes.

13. A mobile communication device, comprising:

one or more processors; and one or more non-transitory computer-readable media storing computer-executable instructions that, when executed by the one or more processors, cause the mobile communication device to perform actions comprising:

communicating using a first communication channel, wherein the first communication channel uses a first radio access technology;

receiving a first instruction to measure a second communication channel during a first measurement gap, wherein the second communication channel uses a second radio access technology;

during the first measurement gap, attempting to measure the second communication channel to obtain a signal strength, wherein the attempting fails due to a measurement gap misalignment;

in response to failing to measure the second communication channel, determining an amount of misalignment between the first communication channel and the second communication channel, wherein determining the amount of misalignment is based on:

comparing frame numbers or subframes numbers of frames or subframes received from the first communication channel and the second communication channel, and determining a number of frames or a number of subframes by which signals of the first communication channel and the second communication channel are out of alignment;

obtaining a second measurement gap, wherein the second measurement gap has a timing that is determined based at least in part on the amount of misalignment; and during the second measurement gap, measuring the second communication channel to obtain the signal strength.

14. The mobile communication device of claim 13, the actions further comprising reporting the amount of misalignment to a cellular base station, wherein obtaining the second measurement gap comprises receiving the second measurement gap from a cellular base station.

15. The mobile communication device of claim 13, wherein obtaining the second measurement gap comprises:

by the mobile communication device, determining the timing of the second measurement gap based at least in part on the amount of misalignment.

16. The mobile communication device of claim 13, wherein:

the first communication channel uses a Long-Term Evolution (LTE) radio access technology; and the second communication channel uses a New Radio (NR) radio access technology.

17. The mobile communication device of claim 13, wherein:

the first communication channel is implemented by a signal having a radio frequency that is within a first radio frequency band; and the second communication channel is implemented by a signal having a radio frequency that is within a second radio frequency band, wherein the first radio frequency band is different than the second radio frequency band.

\* \* \* \* \*